United States Patent [19]

Padovani

[11] Patent Number: 4,560,339
[45] Date of Patent: Dec. 24, 1985

[54] EXTRACTING SYSTEM FOR FABRICATED OBJECTS FORMED BY A THERMO-FORMING MACHINE

[75] Inventor: Pietro Padovani, Verona, Italy

[73] Assignee: Officine Meccaniche Veronesi SpA (O.M.V.), Parona, Italy

[21] Appl. No.: 665,010

[22] Filed: Oct. 26, 1984

[30] Foreign Application Priority Data

Nov. 15, 1983 [IT] Italy ................................ 84977 A/83

[51] Int. Cl.⁴ .............................................. B29C 3/00
[52] U.S. Cl. .................................................... 425/437
[58] Field of Search .......................... 425/437, 501, 810

[56] References Cited

U.S. PATENT DOCUMENTS

| | | | |
|---|---|---|---|
| 3,142,863 | 8/1964 | Mazzoni | 425/437 X |
| 3,514,813 | 6/1970 | Wertermann | 425/501 |
| 3,526,690 | 9/1970 | Bachman | 425/437 X |
| 3,578,735 | 5/1971 | Cholmar et al. | 425/437 X |
| 3,645,658 | 2/1972 | De Troyer | 425/437 X |
| 3,862,815 | 1/1975 | Roczynski et al. | 425/810 |
| 4,312,823 | 1/1982 | Kraakman et al. | 425/437 X |

*Primary Examiner*—J. Howard Flint, Jr.

[57] ABSTRACT

The invention applies to thermoforming apparatus with presses in which the objects are formed and cut in one unit and relates to an extractor for removing the objects from the presses and setting them down elsewhere, among other places in the channels of a stacker. The extractor consists of a movable plate (12) provided with channels and holes for supplying adjustable suction and compression by connection to a vacuum and compressed air unit in order to extract the objects (13) from the recesses in a die (9) and to transfer them to a stacker (26).

14 Claims, 11 Drawing Figures

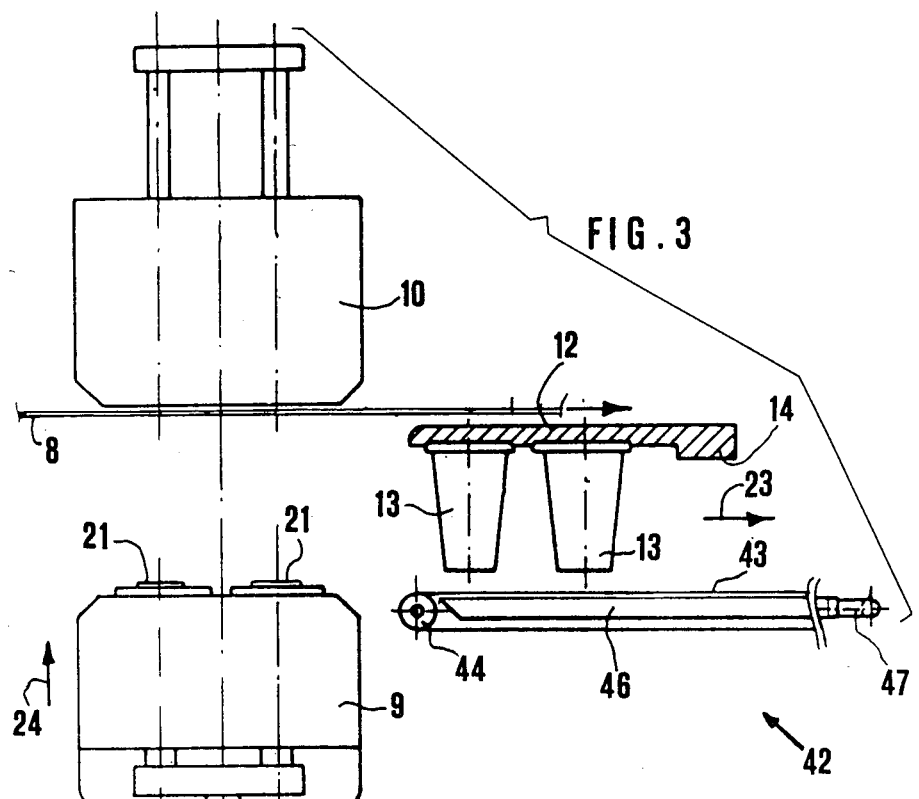
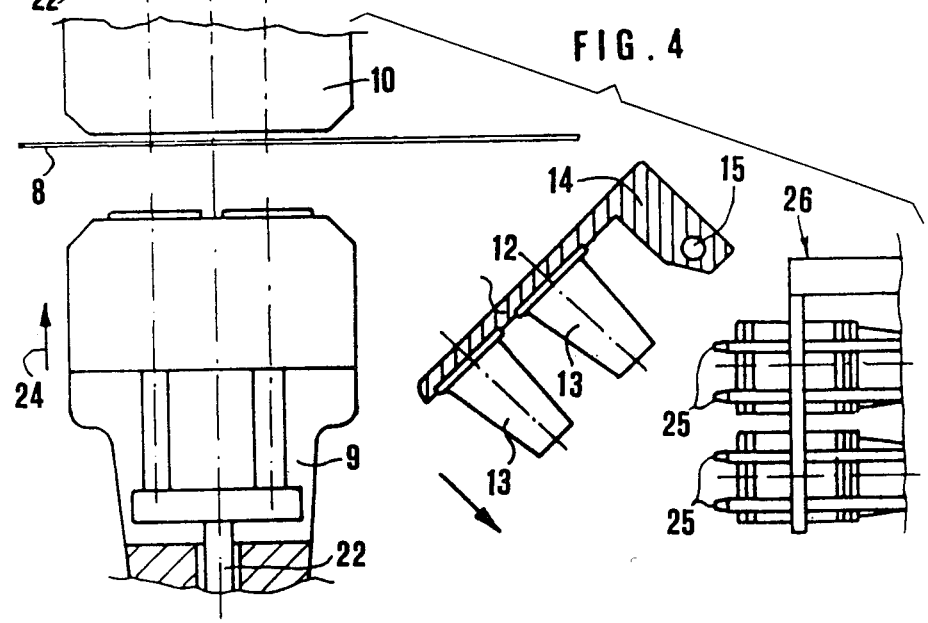

EXTRACTING SYSTEM FOR FABRICATED OBJECTS FORMED BY A THERMO-FORMING MACHINE

It is known that many types of thermoforming apparatus for objects made from a sheet of synthetic material using dies with one or more recesses containing the objects formed and cut in a single unit, in the main discharge the objects to a bin when the thickest parts thereof, which normally coincide with the edges of the objects, have become sufficiently stable.

This type of unloading involves reorganisation of the objects so that they may be subjected to further processing such as printing, edging, counting, packing, packaging and the like, with a considerable loss of time and the use of manual labour.

The principal object of the invention is to overcome the disadvantage inherent in this type of extraction.

Another object of the invention is to increase the hourly output from a thermoforming apparatus.

The task of the invention is to provide means which will enable the objects to be extracted from the recesses which contain them and to place them in an orderly manner elesewhere, including into the channels of a stacker.

A subordinate task of the invention is to construct the said means in such a way that the objects can be extracted before their thickest parts have become sufficiently stabilised or sometimes have achieved the necessary degree of cooling.

It is clear that by freeing the press of objects before they have become sufficiently stabilised or have achieved the necessary amount of cooling, the press will become available for further pressing in a shorter time than is required in accordance with the known technique.

The invention may therefore advantageously be applied to sophisticated thermoforming machines, such as for example those according to Italian Pat. No. 1,053,243, in that even in these machines the objects are only extracted from the recesses containing them when their thickest portions have become sufficiently stabilised.

According to the present invention there is provided an extractor for hollow or similar objects of any shape obtained from a sheet of synthetic material using a thermoforming apparatus in which the objects are formed and cut in one unit using dies with several rows of recesses containing the objects, which are removed from the press and set down away from it in an orderly manner as well as possible into the channels of a stacker, in which the extractor comprises at least one movable plate having a supporting surface for the objects, said plate being provided with channels and holes for supplying adjestable suction and pressure by connection to a vacuum and compressed air unit.

Also in accordance with the invention there is provided an extractor for hollow or similar objects of any shape obtained from a sheet of synthetic material using a thermoforming apparatus in which the objects are formed and cut in one unit using dies with several rows of recesses containing the objects, which are removed from the press and set down away from it in an orderly manner, as well as possible into the channels of a stacker, in which the extractor comprises at least one movable plate having a supporting surface for the objects which is provided with channels for the circulation of cooling fluids within the plate and channels and holes for supplying adjustable suction and pressure by connection to a vacuum and compressed air unit.

Further in accordance with the present invention there is provided an extractor for hollow or similar objects of any shape obtained from a sheet of synthetic material using a thermoforming apparatus in which the objects are formed and cut in one unit using dies with several rows of recesses containing the objects, which are removed from the apparatus and set down away from it in an orderly manner, as well as possible into the channels of a stacker, in which the extractor comprises at least one movable plate having a supporting surface for the objects, which is provided with channels for the circulation of cooling fluids within the plate and channels and holes for supplying adjustable suction and pressure by connection to a vacuum and compressed air unit, the said plate discharging the objects onto a moving conveyor to which the objects adhere by air sution.

The present invention will be further illustrated, by way of example, with reference to the accompanying drawings in which:

FIG. 3 is a schematic view, in partial cross-section, of the two dies in the open position with the extractor plate, which has removed the objects from the forming and cutting unit, and is in a position appropriate for discharging the objects onto a conveyor belt;

FIG. 4 is a schematic view, in partial cross-section, of the two dies which are closing, with the extractor plate in a different version from that in the previous Figures, ready to deposit the objects into a horizontal stacker;

In the following description, the same reference numerals are utilised in the Figures, to identify identical or equivalent parts.

Figure 1:
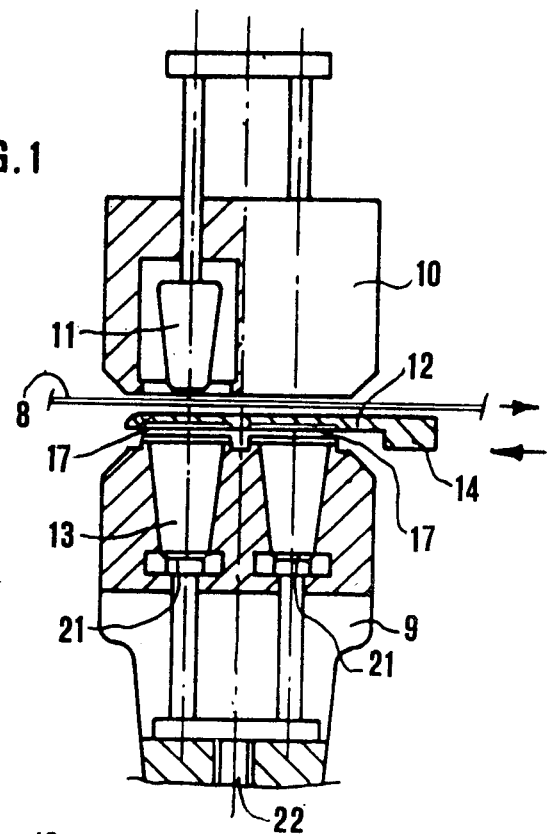
FIG. 1 is a schematic view, in partial cross-section, of the two dies of a conventional thermoforming apparatus with an extractor plate inserted therebetween.

As illustrated in FIG. 1, the press of a conventional machine consists of two dies 9 and 10, of which die 9 is provided with recesses to contain the objects 13 formed and cut from a sheet 8 of synthetic thermoplastics material while die 10 carries formers 11 and at least one part of the means for cutting thermo-formed objects, the said means being omitted in various Figures.

The two dies 9, 10, in FIG. 1 are illustrated in a slightly open position so as to allow the extractor plate 12 to be inserted between the lower die 9 and the sheet 8.

Plate 12 is movable and its head 14 is attached to an arm, not shown, which by known means controls its insertion between the two open dies 9, 10 as well as the unloading thereof.

Plate 12 is provided with recesses 17 having a profile corresponding to that of the parts of the objects opposite thereto and which are to be extracted.

Figure 5:
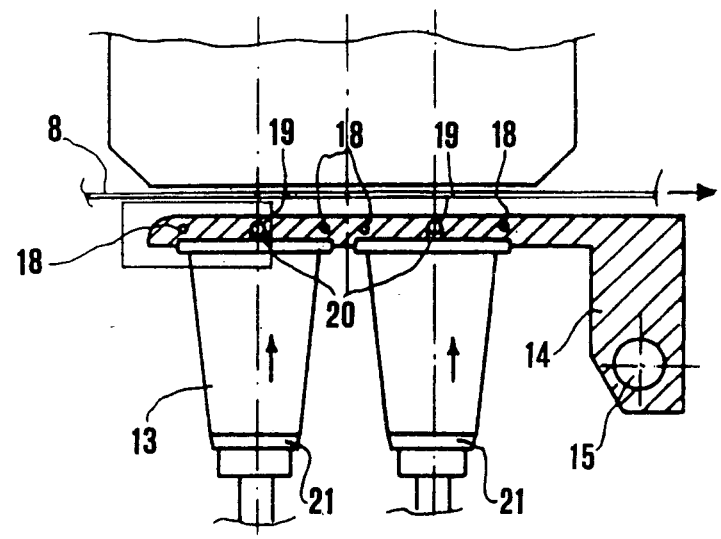
FIG. 5 is a schematic view of an alternative embodiment of the extractor plate illustrated in FIG. 4, and on a larger scale than in the previous Figures.

Although not shown in FIG. 1, the plate 12 is provided with channels 18 for the circulation of cooling fluids within the plate and, as may be seen particularly in FIG. 5, channels 19 with holes 20 for adjustable suction and pressure by connection to a vacuum and compressed air unit respectively, which is not shown in FIG. 5.

When the plate 12 has been inserted between the two dies 9 and 10, see FIG. 1, by movement at right angles to the axis of the apparatus, it can also be moved relative to the axis of the apparatus so as to bear against die 9 thereof by means of a device which is not shown. At the same time, a negative pressure is set up within the objects (beakers) 13 via holes 20 and channels 19 holding them against the supporting surface 17, while die 9 continues its downward course to reach the position illustrated in FIG. 2.

Ends 21 are then caused to separate from beakers 13 by means of piston 22 in order to allow the plate 12 to move in the direction indicated by arrow 23 in FIG. 3 to carry the beakers 13 away from the forming and cutting unit.

With reference to FIG. 1, when it is not desired to move the plate 12 in a coaxial relationship with the press in order to rest against die 9 thereof, the beakers 13 may be separated from the walls of the recesses in which they are housed by action on their bases 21 by means of piston 22 to push them so that they adhere to seats 17, upon which they remain attached by the negative pressure which is set up within them by the aforementioned channels 19 and holes 20.

In any event, once the plate 12, with the beakers 13, has left the forming and cutting unit, followed by the sheet 8 which advances one step as seen in FIG. 3, die 9 of the press is caused to move in the direction of arrow 24 in order to press out another set of beakers.

In the meantime, as the result of breaking the connection between the plae 12 and the vacuum unit or by switching it to the compressed air unit, the beakers 13 fall onto a continuous perforated belt 43 which is mounted on rotating drum 44 and remain therein in an upright position due to the suction action of suction diffuser 46 attached to pipe 47 and a vacuum source, not illustrated. This moving conveyor device, which is indicated as a whole by the numeral 42 in FIG. 3, carries the beakers in an orderly fashion to another work station, for example for printing or edging or the like.

With reference to FIG. 4, it will be noted that the plate 12 is identical to the plate illustrated in the previous Figures and is capable of performing the same operations, the only difference being that its head 14 can also pivot about a pin 15 having its axis parallel to the plate itself. In fact, once the beakers 13 have been removed from the forming and cutting unit, this acts to feed the beakers to the channels, formed by small rods 25, or a horizontal stacker 26. While the plate 12 is in movement, the negative pressure within the beakers must be such as to prevent them from becoming detached from the plate 12 by the resistance which they encounter in the air.

Once the beakers 13 have been fed into the channels of the stacker 26, it is sufficient to shut off the connection between the plate 12 and the vacuum unit or to switch it to the compressed air unit, for the beakers to separate from the plate 12 and remain in stacker 26.

Figure 6:
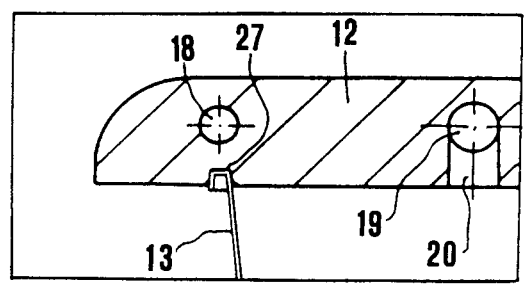
FIG. 6 is an enlarged detail, in cross-section, of a portion of the extractor plate illustrated in FIG. 5.

Plate 12 is then made to take up a position from which it can extract a further set of beakers. According to the embodiment illustrated in FIG. 6, it will be noted that support surface 27 is formed with channels corresponding to the edges of beakers 13, thus considerably increasing the surface area contributing to stabilisation or prolonging the cooling of the thickest portion of the beakers.

Figure 7:
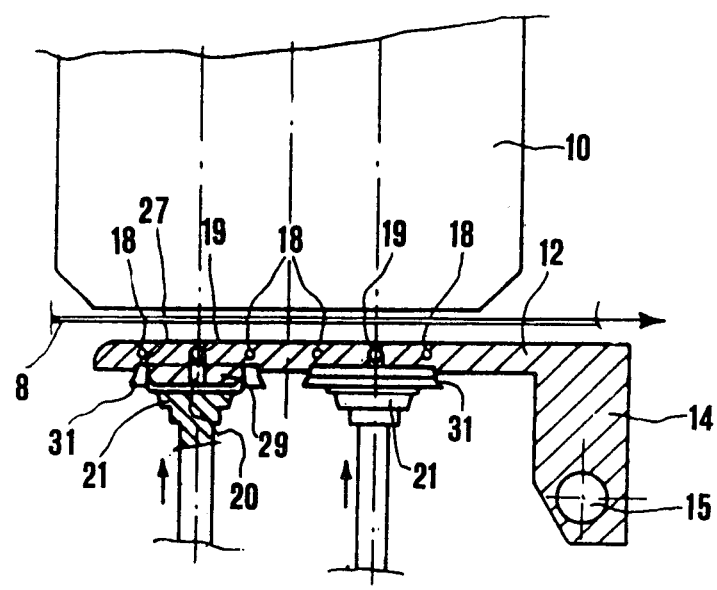
FIG. 7 is a schematic view of a further embodiment of the extractor plate with objects differing from those illustrated in the previous Figures.

With reference to the embodiment illustrated in FIG. 7, it will be noted that supporting surface 29 consists of projections in the plate 12 which are connected to grooves 27 and have a configuration such that they can adhere at least partly to the objects to be extracted, which in this instance consits of covers or lids 31. Even though not illustrated in FIG. 7, it is clear that projections 29 which have the shape of the frustum of a cone may have their flat portion in contact with covers 31, that is with the thickest portions of the same.

Figure 9:
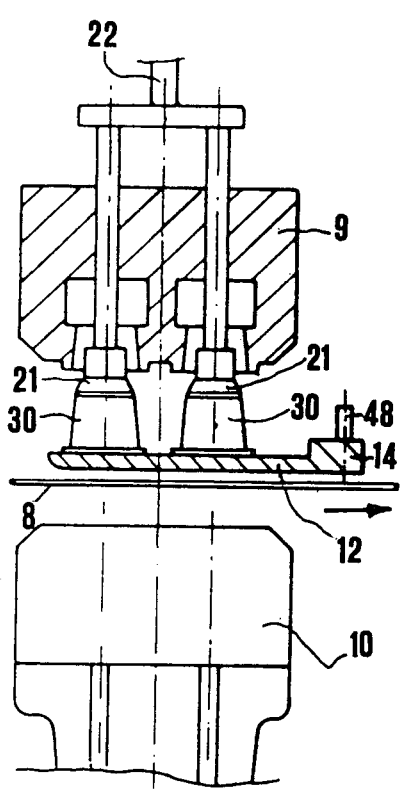
FIG. 9 is a schematic view, similar to the foregoing, with objects extracted from the recesses in the die.
Figure 8:
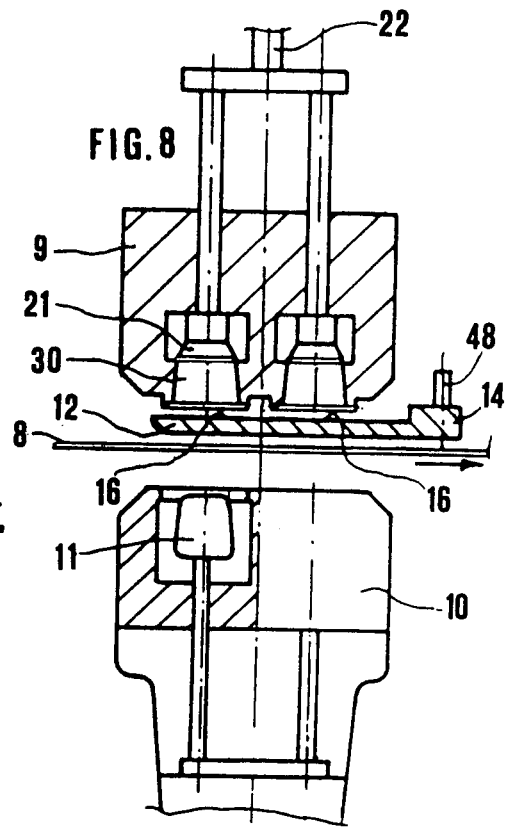
FIG. 8 is a schematic view, in partial cross-section, of the two dies of a conventional thermoforming apparatus with an extractor plate in a different arrangement from that in the previous Figures, inserted therebetween.

With reference to FIGS. 8 and 9, it will be seen that the die 9 lies above the sheet 8 and may be used to produce cups 30, while the die 10, on the other hand, is beneath the sheet 8.

In these Figures, the plate 12 has a supporting surface 16 consisting of the flat surfaces of plate 12 opposite the objects which are to be extracted. In addition to this, even though not illustrated, the said plate 12 is provided with channels 19 and hoels 20 as in the embodiments previously described.

It should also be noted that the said plate 12 may be inserted between the die 9 and the sheet 8 by movement in a direction at right angles to the axis of the apparatus and removed by rotation of the plate itself about a pin 48 inserted in the head 14 and located at right angles to the plate 12.

The remaining movements of the plate 12, ends 21 and the two dies 9, 10 in this embodiment are identical to those described in relation in FIGS. 1 to 3, in the same way as the operations of unloading onto a similar moving conveyor 42 which is not shown are comparable, it being possible for this conveyor also to be replaced by a moving conveyor 32 which will be described in relation to FIGS. 10 and 11.

Figure 2:
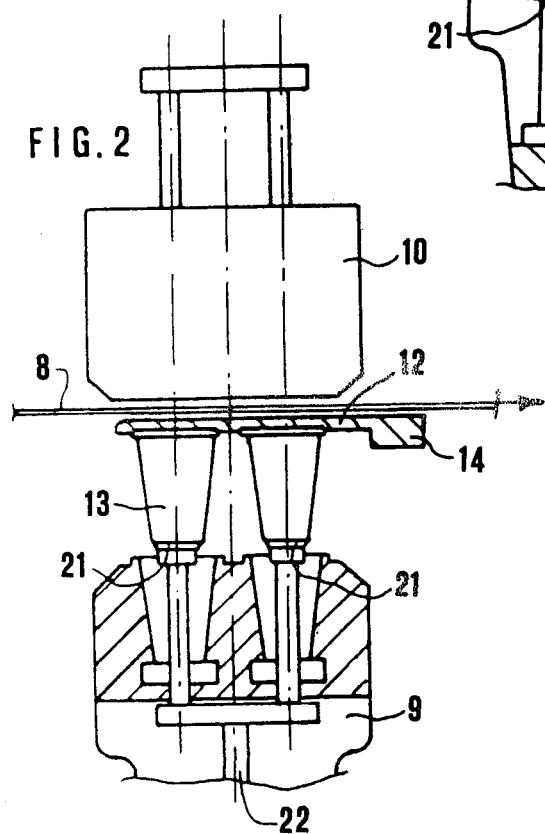
FIG. 2 is a similar view to that of FIG. 1, but with the objects removed from the recesses in the die.

In these last two Figures, the plate 12 has supporting surfaces 16 consisting of the flat surface of the plate opposite the objects which are to be extracted and is able to perform the same movements and the same operations as are described for the plate 12 in FIGS. 1 to 3. Dies 9 and 10 are shown in the same positions as in FIGS. 3 and 4 and are capable of manufacturing covers or lids 31 which are unloaded onto a moving conveyor 32. Covers or lids 31 are unloaded by means of excess pressure in the recesses therefor into receptacles 33 with adjustable suction and pressure which are connected to a vacuum and compressed air unit, which is not shown, by means of pipes 34, 35 and channels in plate 36 which are also not shown. The said lids 31 are then held by sucking out the air from receptacles 33, which can be rotated by a lever mechanism 37 which can be made to rotate by shaft 38 and is pivoted at its other end by means of pin 39 to plate 36 which is integral with connecting rod 35 which, in turn, is able to move between sleeve 40, which is pivoted at 41, to a fixed portion of the supporting frame, which is not shown, of moving conveyor 32.

By rotation of lever 37, indicated by arrows 45, the receptacles 33 move towards a stacker 26 and once lids 31 have been fed into the channels formed by rods 25 they are projected into the stacker in an orderly manner by the excess pressure created in receptacles 33.

Figure 10:
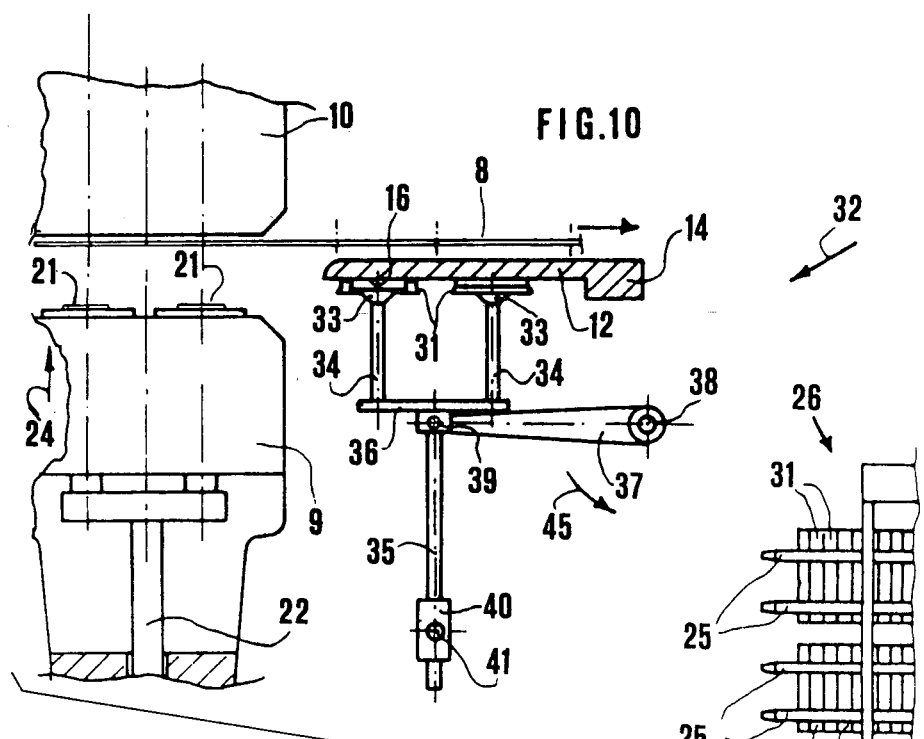
FIG. 10 is a schematic view, similar to that in FIG. 3 with a conveyor mechanism and a horizontal stacker shown schematically.
Figure 11:
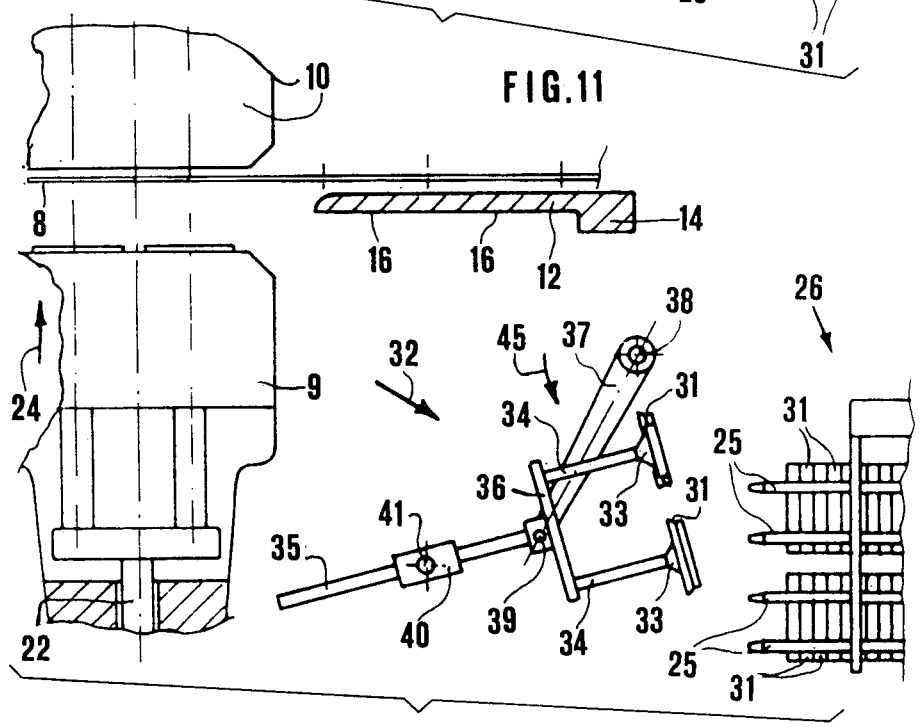
FIG. 11 is a schematic view, similar to the foregoing with a conveyor device illustrated as it is inserting the objects into the stacker.

Receptacles 33 are then returned to the position shown in FIG. 10 by means of lever mechanism 37, 38, 39, 40, 41 to receive the lids 31 from the next press cycle.

It is clear to one skilled in the art that the extractor plate described in relation to the various embodiments may be associated with objects of any configuration even if these are not stackable and may also be associated with moving conveyors and stackers differing from those illustrated.

I claim:

1. In a thermoforming apparatus of the type in which thermofored objects are formed from a sheet of synthetic material and cut in one unit, using dies with several rows of recesses containing the objects, and are thereafter removed from the unit by an extractor to a position away from the unit, wherein the improvement comprises said extractor having at least one movable plate with a supporting surface for the objects, said plate being provided with channels and holes for supplying adjustable suction and pressure by connection to a vacuum and compressed air unit.

2. A thermoforming apparatus according to claim 1, in which the supporting surface consists of a flat surface of the plate opposite the objects which are to be extracted.

3. A thermoforming apparatus according to claim 1, in which the supporting surface opposite the objects is constructed with recesses, each having a profile corresponding to that of the objects which are to be extracted.

4. A thermoforming apparatus according to claim 1, in which the supporting surface opposite the objects consists of grooves, each corresponding to the edges of the objects.

5. A thermoforming apparatus according to claim 1, in which the supporting surface opposite the objects is constructed at least in part by projections, each of a shape such as to adhere at least partly to the objects which are to be extracted.

6. A thremoforming apparatus according to claim 1, in which the plate moves at right angles to the axis of the apparatus.

7. A thremoforming apparatus according to claim 1, in which the plate can be moved in a coaxial relationship with the apparatus.

8. A thermoforming apparatus according to claim 1, in which the plate can be moved in a direction parallel to the axis of the apparatus when it is outside the apparatus.

9. A thermoforming apparatus according to claim 1, in which the plate can move around a pin having its axis parallel to the plate itself.

10. A thermoforming apparatus according to claim 1, in which the plate can move around a pin at right angles to the plate itself.

11. An extractor for hollow or similar objects of any shape obtained from a sheet of synthetic material using a thermoforming apparatus in which the objects are formed and cut in one unit using dies with several rows of recesses containing the objects, which are removed from the unit to position away from the unit in an orderly manner, in which the extractor comprises at least one movable plate having a supporting surface for the objects which is provided with channels for the circulation of cooling fluids within the plate and channels and holes for supplying adjustable suction and pressure by connection to a vacuum and compressed air unit.

12. An extractor for hollow or similar objects of any shape obtained from a sheet of synthetic material using a thermoforming apparatus in which the objects are formed and cut in one unit using dies with several rows of recesses containing the objects, which are removed from the apparatus to a position away from the apparatus in an orderly manner, in which the extractor comprises at least one movable plate having a supporting surface for the objects, which is provided with channels for the circulation of cooling fluids within the plate and channels and holes for supplying adjustable suction and pressure by connection to a vacuum and compressed air unit, the said plate discharging the objects onto a moving conveyor to which the objects adhere by air suction.

13. An extractor according to claim 12, in which the moving conveyor consists of rotating drums, a continuous perforated belt and a diffuser connected by pipes to a vacuum source.

14. An extractor according to claim 12, in which the moving conveyor comprises receptacles with adjustable suction and compression connected to a vacuum and compressed air unit by means of pipes and channels in the plate which can be rotated by means of a lever mechanism.

* * * * *